(12) United States Patent  (10) Patent No.: US 9,188,479 B2
Richer  (45) Date of Patent: Nov. 17, 2015

(54) VIBRATION SENSOR IN A PORTABLE VIBRATION METER

(71) Applicant: Fluke Corporation, Everett, WA (US)

(72) Inventor: Paul Richer, Everett, WA (US)

(73) Assignee: Fluke Corporation, Everett, WA (US)

( * ) Notice: Subject to any disclaimer, the term of this patent is extended or adjusted under 35 U.S.C. 154(b) by 331 days.

(21) Appl. No.: 13/800,705

(22) Filed: Mar. 13, 2013

(65) Prior Publication Data

US 2014/0260639 A1    Sep. 18, 2014

(51) Int. Cl.
*G01H 17/00*    (2006.01)
*G01H 1/00*    (2006.01)

(52) U.S. Cl.
CPC ............... *G01H 17/00* (2013.01); *G01H 1/00* (2013.01); *G01H 1/003* (2013.01)

(58) Field of Classification Search
CPC .......... G01H 1/00; G01H 1/003; G01H 17/00
USPC .......................................................... 73/649
See application file for complete search history.

(56) References Cited

U.S. PATENT DOCUMENTS

| 2,753,948 | A |   | 7/1956  | Ongaro |
| 4,827,771 | A |   | 5/1989  | Cary |
| 5,569,866 | A | * | 10/1996 | Allison ................... 73/862.626 |
| 6,006,164 | A | * | 12/1999 | McCarty et al. ................. 702/56 |
| 6,234,021 | B1 | * | 5/2001 | Piety et al. ..................... 73/592 |
| 6,257,066 | B1 | * | 7/2001 | Chandler et al. ................ 73/660 |
| 7,523,662 | B2 | * | 4/2009 | Drahm et al. ................... 73/430 |
| 8,049,636 | B2 | * | 11/2011 | Buckingham et al. ........ 340/683 |
| 8,578,774 | B2 | * | 11/2013 | Ohta et al. ...................... 73/493 |
| 2009/0256817 | A1 |   | 10/2009 | Perlin |
| 2011/0079084 | A1 |   | 4/2011 | Zusman |

FOREIGN PATENT DOCUMENTS

| DE | 10 2004 035 246 B3 | 3/2006 |
| JP |       62-38323 A   | 2/1987 |
| JP |    2009-109339 A   | 5/2009 |
| WO |    2013/049436 A1  | 4/2013 |

OTHER PUBLICATIONS

Extended European Search Report mailed Dec. 5, 2014, issued in corresponding European Patent Application No. EP 14159548.8, filed Mar. 13, 2014, 10 pages.

"The Fluke 805 Vibration Meter," Fluke Corporation, Everett, Wash., Apr. 2012, 4-page brochure.

* cited by examiner

*Primary Examiner* — J M Saint Surin

(74) *Attorney, Agent, or Firm* — Seed IP Law Group PLLC

(57) ABSTRACT

A vibration detector suitable for field use and associated systems and methods are disclosed. A representative apparatus includes a vibration sensor in contact with the vibrating structure. The vibration sensor can be in contact with the vibration isolators to eliminate the frequencies of the operator's hand. In some embodiments, a contact force between the vibration sensor and the vibrating structure can be measured using, for example, contact resistors. Since the sensitivity of the vibration sensor can be a function of the contact force, the vibration amplitude measurements can be adjusted for a known contact force to improve the precision of the vibration amplitude measurement.

18 Claims, 6 Drawing Sheets

VIBRATION SENSOR IN A PORTABLE VIBRATION METER

TECHNICAL FIELD

The present technology is directed generally to vibration meters, and associated systems and methods.

BACKGROUND

Vibration can be an important consideration when designing, testing, and maintaining machinery. For example, significant levels of vibration can indicate poor design or an impeding failure of the machinery. The presence of unexpected frequency peaks in a vibrating structure may indicate nonlinear interactions among the natural frequencies of the subassemblies, which can cause premature failure of the machinery. In some applications, detecting an increase in vibration amplitude is a trigger for initiating equipment maintenance and/or service.

Vibration detection is often performed in the field by attaching one or more accelerometers or other vibration sensors to the rotating machinery or other vibrating structure. Vibration sensors produce output signals that can be used to determine the amplitude and frequency of vibration. It is known that contact between the vibration sensor and the vibrating structure can be improved by rigidly attaching vibration sensors (i.e., accelerometers) to the rotating machinery. In general, rigidly attaching the vibration sensor improves the transmission of vibrations from the vibrating structure to the sensor. However, such rigid attachment may not be possible or at least not practical with hand held vibration meters, which are preferred for the field use. Instead, a hand held vibration detector is typically kept by hand in contact with rotating machinery in the field to measure the vibrations.

FIG. 1 is a plan view of a conventional vibration meter 100. In operation, a wand 3 of the vibration meter 100 contacts a vibrating structure 5. The vibrations are transmitted through the wand 3 to an accelerometer 2 inside a housing 4. When subjected to vibrations, the accelerometer 2 produces an output signal to be routed to electronics within the unit 100 via wires 6. The unit 100 then determines vibration amplitude/frequency based on the signal coming from the accelerometer. The output (i.e., the amplitude and frequency of the vibration) can be displayed using display 7. However, such a conventional device is sensitive to the quality of contact between the device and the vibrating structure. Therefore, the accuracy of reading for the vibration sensor in a hand-held device remains a problem.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure. Furthermore, in the drawings, like reference numerals designate corresponding parts throughout the several views.

DETAILED DESCRIPTION

Specific details of several embodiments of representative vibration meters and associated methods for vibration measurements are described below. In some embodiments of the present technology, the vibration meter is a hand held device that contacts a vibrating structure (e.g., rotating machinery) and measures vibrations of the vibrating structure. The vibration meter can also include a force sensor to measure force between the vibration sensor and the vibrating equipment. The measurement of force can be used to improve accuracy of the vibration reading (e.g., amplitude and frequency) because the output of the vibration sensor generally changes with the intensity of the contact force between the vibration meter and the vibrating structure. Therefore, in some embodiments, the output of the vibration sensor can be combined with the force reading to produce an adjusted output that automatically takes into account the contact force without further input from the user. Furthermore, one or more vibration isolators can contact the vibration sensor to filter the noise created by the unsteadiness or shaking of the hand of the operator, which, if unfiltered, would appear as low frequency vibrations at the output of the vibration sensor. A person skilled in the relevant art will also understand that the technology may have additional embodiments, and that the technology may be practiced without several of the details of the embodiments described below with reference to FIGS. 2-5.

Figure 1:
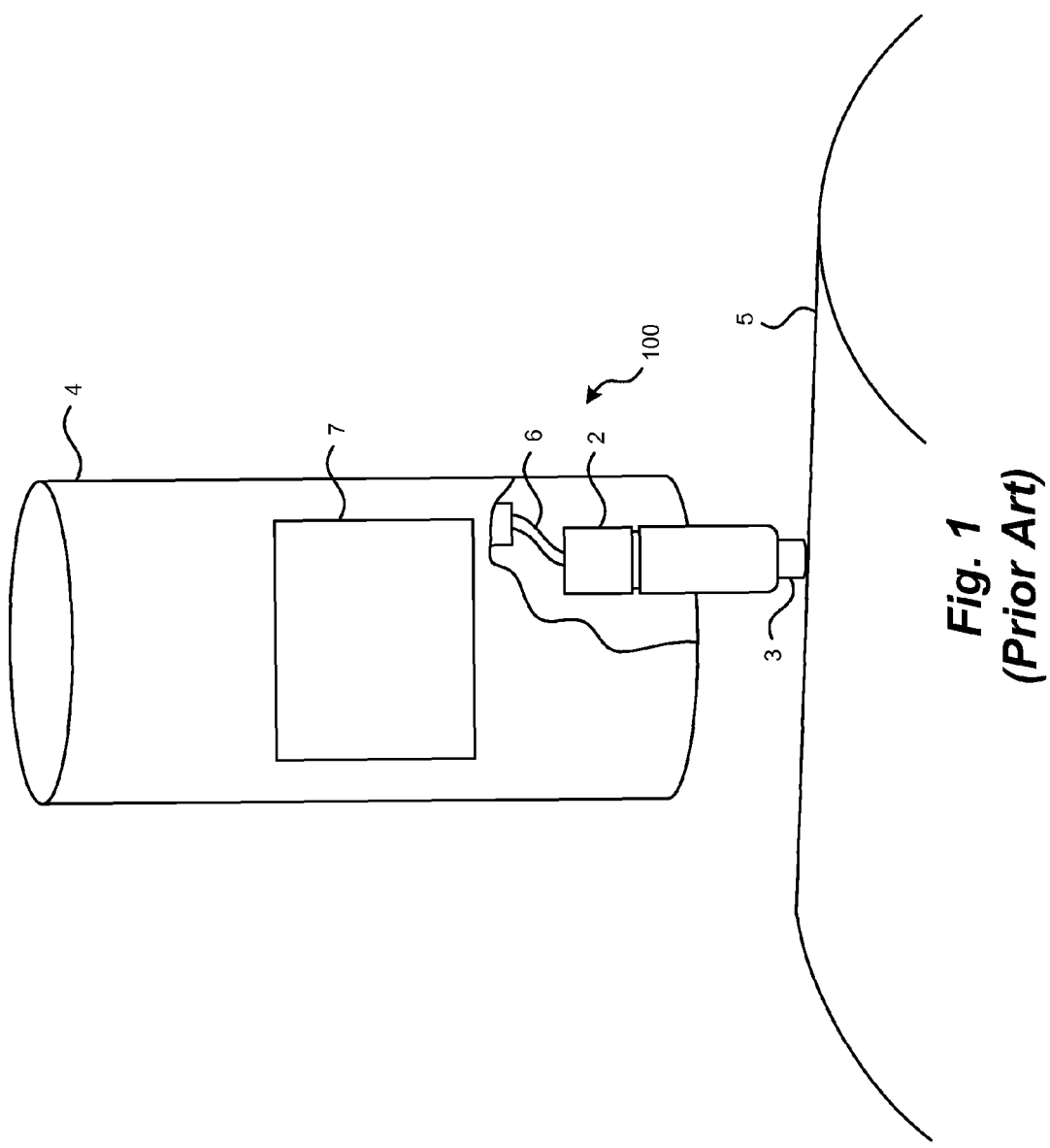
FIG. 1 is a plan view of a hand held vibration meter in accordance with the prior art.
Figure 2:
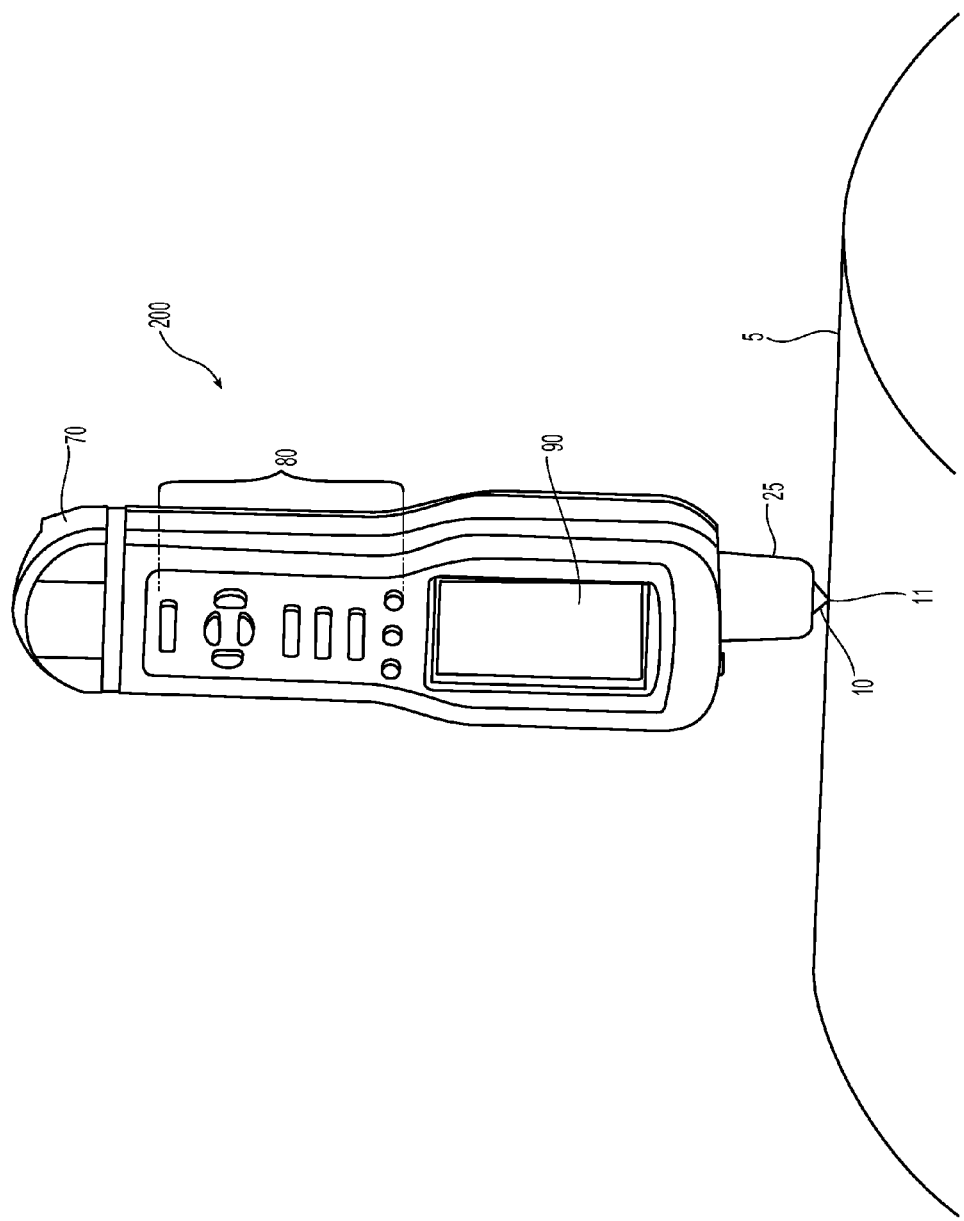
FIG. 2 is a plan view of a hand held vibration meter in accordance with an embodiment of the presently disclosed technology.

FIG. 2 illustrates a vibration meter 200 in accordance with embodiments of the presently disclosed technology. The vibration meter 200 has a housing 70 that can be made from molded plastic or other suitable materials. In operation, the vibration meter 200 can be hand held against a vibrating structure 5 such that a vibrating sensor 10 contacts the vibrating structure. In other embodiments of the technology, the vibrating sensor may contact the vibrating structure 5 through an intermediary element (not shown) that transfers the vibrations from the vibrating structure to the vibrating sensor. The vibrating sensor 10 can be protected from mechanical or environmental damage by a jacket 25, which can be made of rubberized molded plastic, metal, textile, or other suitable materials. In some embodiments, the vibrating sensor 10 can have a tip 11 that is harder than the rest of the vibrating sensor 10 to improve the contact between the vibrating sensor 10 and the vibrating structure 5. A person skilled in the art would know of many examples of vibrating sensors including, for example, accelerometers. The vibrating sensor 10 is connected to signal processing electronics (not shown in FIG. 2) inside the housing 70. The signal processing electronics can determine the amplitudes and frequencies of the vibration based on the output from the vibration sensor 10. For example, the amplitude of vibration can be determined by twice integrating the signal from the vibration sensor 10 (e.g., an accelerometer). A person skilled in the art would know of many methods for numerically or electronically integrating a vibrating sensor signal to determine the corresponding displacement of the vibrating structure under the measurement. Command buttons 80 and a display 90 can be used to select and display the frequencies and amplitudes of vibrations corresponding to the vibrating structure 5. As discussed in detail with reference to FIGS. 3A-5 below, the low frequency noise can be filtered from the vibration sensor 10. Furthermore, the signal from the low frequency noise can be processed in conjunction with the signal from the force sensor to yield a more accurate vibration reading.

Figure 3A:
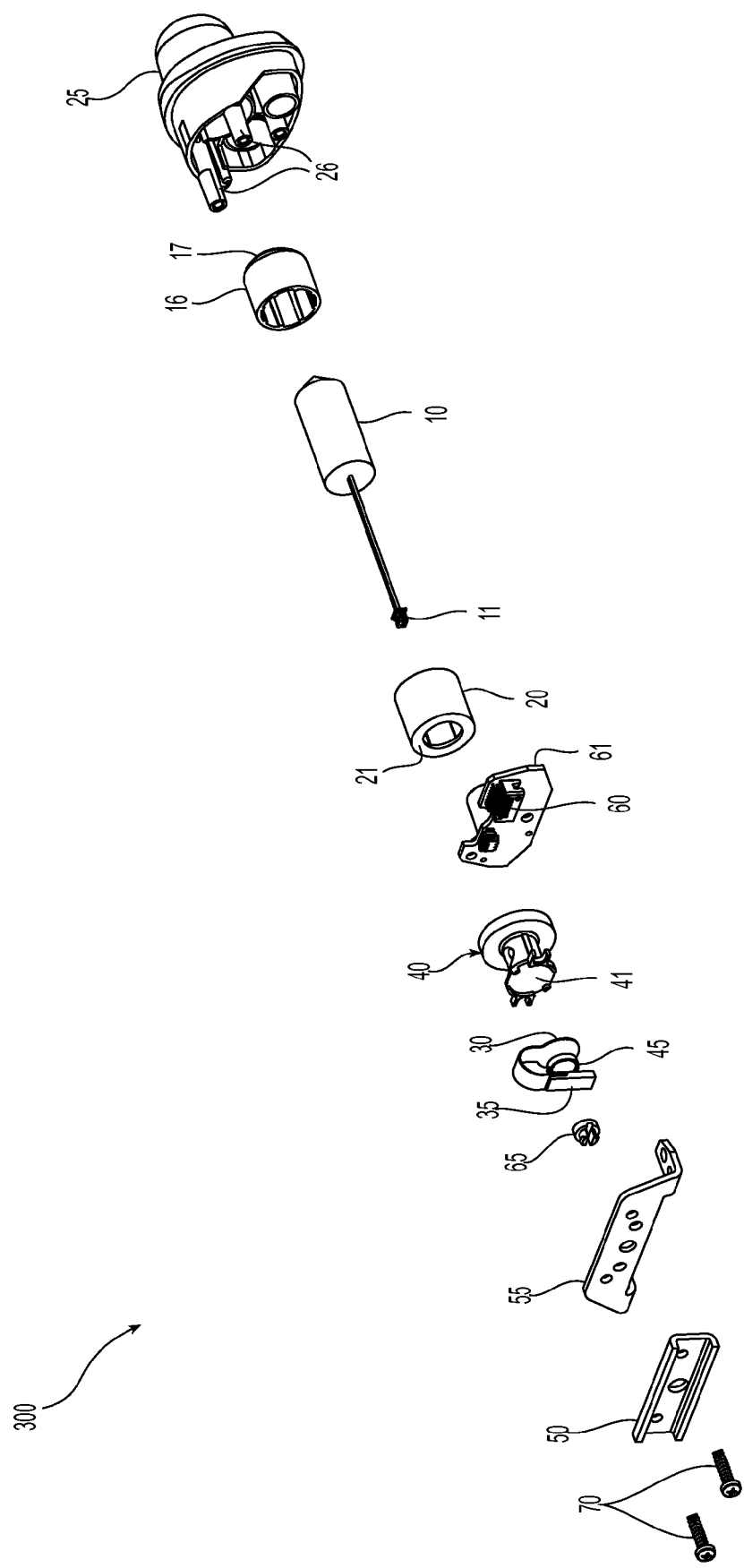
FIG. 3A is an exploded view of a hand held vibration meter in accordance with an embodiment of the presently disclosed technology.

FIG. 3A shows an exploded view of the vibration meter 200 configured in accordance with embodiments of the presently disclosed technology. Starting from the upper right corner of the figure, the vibration sensor jacket 25 can at least partially house the vibration sensor 10 for protection from environmental or mechanical damage. Additionally, in at least some embodiments, the vibration sensor 10 can be at least partially contacted by vibration isolators 16, 20. With conventional hand held vibration meters, the vibration of the operator's hand can be transferred to the vibration sensor 10 and may be erroneously interpreted as being generated by the vibrating structure itself. The vibration of the operator's hand is typically in the low frequency range (e.g., less than about 50 Hz). In at least some embodiments of the inventive technology, the vibration isolators 16, 20 can filter out these low frequencies before they reach the vibration sensor 10. The vibration isolators 16, 20 can be made of rubber-like material or other material that attenuates vibrations of the vibration sensor 10 for the frequencies of interest. For example, the rubber-like material can be selected based on its known frequency attenuating properties. The vibration isolators 16, 20 can have lips 17, 21, respectively, for a more secure engagement with the vibration sensor 10. An output signal from the vibration sensor can be transferred through a cable 11 to an interface board 61 and further to signal processing electronics (not shown).

The vibration meter 200 also can include a force sensor 30. When the vibration meter 200 presses against the vibrating structure (not shown), the contact force is transferred from the vibration sensor 10 to the force sensor 30, as explained in more detail with reference to FIG. 3B below. The force sensor can be supported by a structure, for example, a combination of load boss 65, a load beam 55 and a load beam brace 50, to keep the force sensor in place. Screws 70 can engage with receiving threaded holes 26 to hold the parts of the vibration meter 200 in contact.

Figure 3B:
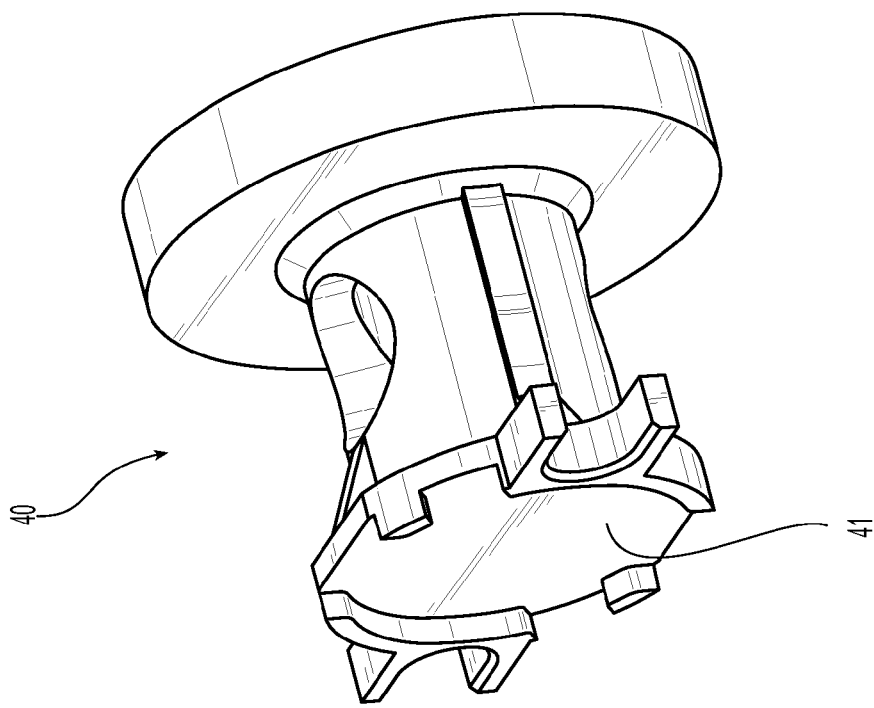
FIG. 3B is an isometric view of a force sensor assembly in accordance with an embodiment of the presently disclosed technology.
Figure 3B:
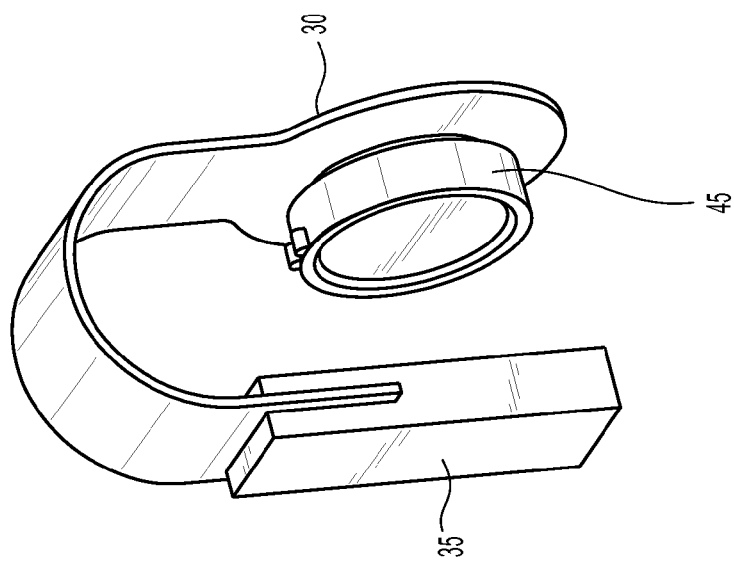

FIG. 3B shows an isometric view of the force sensor 30 positioned between a pad 45 and a plunger 40. A person skilled in the art would know of many force sensors available on the market including, for example, load cells and film resistor force sensors. A plunger 40 having a generally flat first surface 41 can transfer contact force from the vibration sensor to the force sensor 30, which can be sandwiched between the plunger 40 and the pad 45. In some embodiments, the force sensor 30 can be preloaded to precondition its output within the range of sensitivity. The preloading can be achieved by, for example, pressing the plunger 40 against the force sensor 30 that is supported by the elastic pad 45 on the opposite side. When loaded, the force sensor 30 changes its electrical resistance. This change in the resistance, corresponding to the change in force, can be measured through a connector 35. As explained below with reference to FIG. 4, the measurements of vibration amplitude can be improved based on the value of contact force between the vibrating structure and the vibrating sensor.

Figure 4:
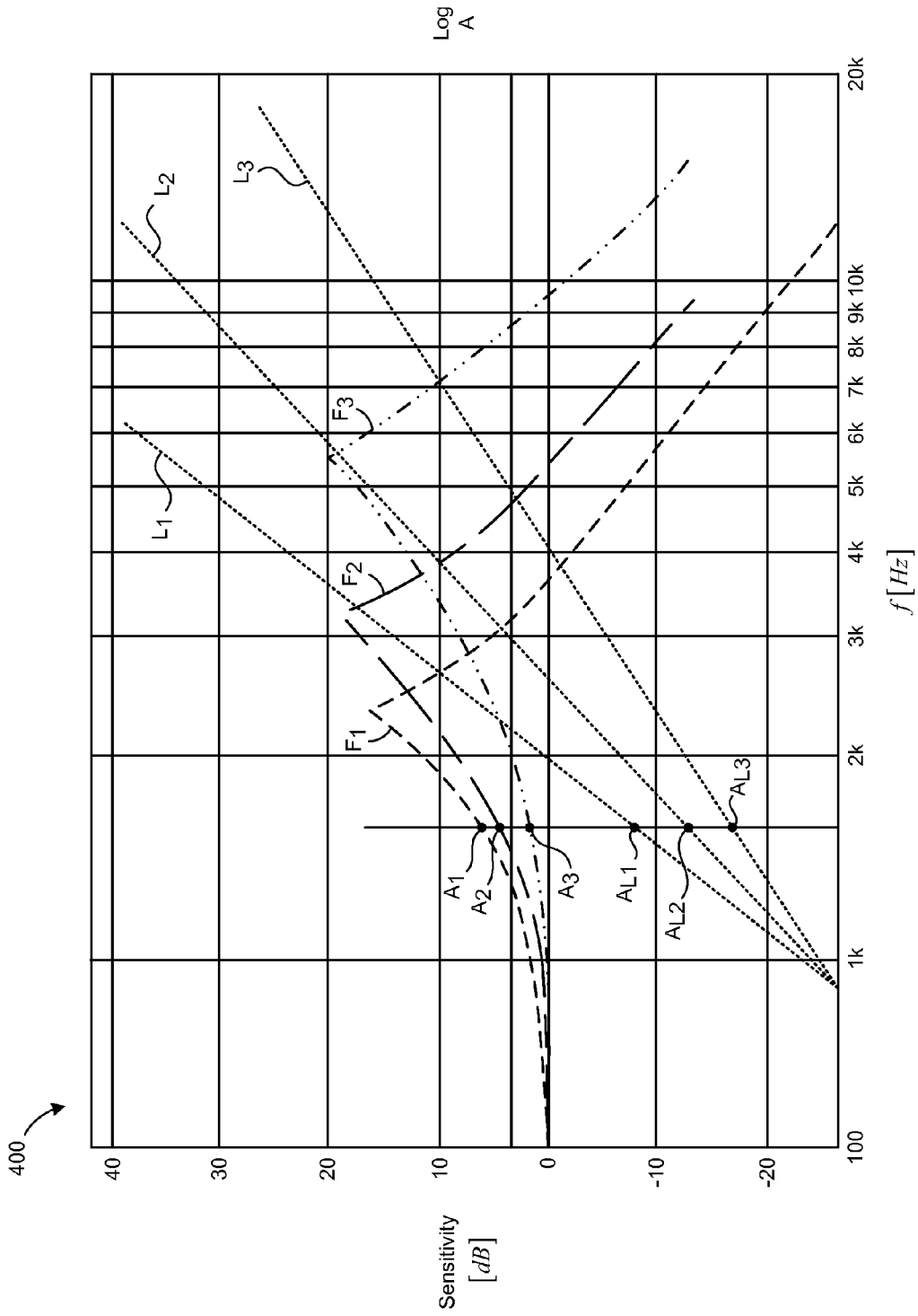
FIG. 4 is a graph of a sensitivity of the vibration sensor as a function of frequency.

FIG. 4 is a graph of frequency response of the vibration sensor 10. The horizontal axis of the graph shows a range of frequencies on a logarithmic scale. The vertical axis on the left shows a sensitivity of the vibration sensor in dB. The sensitivity of a vibration sensor can be interpreted as, for example, a ratio of the amplitude indicated at output of the vibration sensor 10 and the vibration amplitude of the vibrating structure itself. The sensitivity that is close to zero on the logarithmic scale of graph 300 corresponds to a sensitivity value of about one on the linear scale. Conversely, a positive value on the vertical axis indicates a higher sensitivity and a negative value on the vertical axis indicates a lower sensitivity. In general, the sensitivity of a vibration sensor is a function of the vibration frequency. Furthermore, if the sensitivity of vibration sensor is known, an appropriate coefficient or other adjustment can be used to determine the relevant vibration amplitude of the vibration structure at particular frequency of vibration.

The vertical axis on the right shows the vibration amplitude. Normally, the sensitivity of the vibration sensor as a function of frequency can be obtained from the vibration sensor manufacturer or it can be determined experimentally. Therefore, the amplitude of vibration can be back-calculated for a particular frequency of vibration. However, if the sensitivity of the vibration sensor is also a function of the contact force between the sensor and the vibrating structure, a measurement of the vibration amplitude that does not take the contact force into account may reduce the accuracy of the measurement. For example, curves F1, F2, F3 in FIG. 4 may correspond to the vibration amplitude measurements over a range of frequencies, but using different contact force. A person having ordinary skill in the art would know that for a given frequency of vibration an amplitude of vibration can be calculated by integrating the acceleration signal twice and by adjusting the result based on the known sensitivity of the vibration sensor.

In the illustrated example, for the frequency of vibration of about 1.4 kHz, the vibration sensor would indicate vibration amplitudes A1, A2, or A3 for the respective sensitivity curves F1, F2, F3, depending on the magnitude of the contact force between the vibration sensor and the vibrating structure. To obtain more precise vibration amplitude measurements the contact force can be measured and used to select appropriate sensitivity curve, e.g., F1, F2 or F3. The amplitude of the vibrating structure can then be determined from the appropriate sensitivity curve. For example, the force sensor 30 (described with reference to FIGS. 3A-3B) can measure contact force, which is in turn used to select the correct vibration sensitivity curve among the sensitivity curves F1, F2 and F3. In at least some embodiments, the sensitivity curves can be available in a tabulated form for easier calculations per relevant frequencies of vibration. The tabulated sensitivity curves can be accessed using suitable electronics based on the force sensor reading, and then further processed to calculate the vibration amplitude using, for example, signal integrating algorithms. In some embodiments, the sensitivity curves can be linearized using linearization circuits. For example, the sensitivity curves F1, F2, F3 can be linearized to yield linearized sensitivity curves L1, L2, L3, respectively. In at least some embodiments, the linearized sensitivity curves make the vibration amplitude calculation easier and/or faster.

Figure 5:
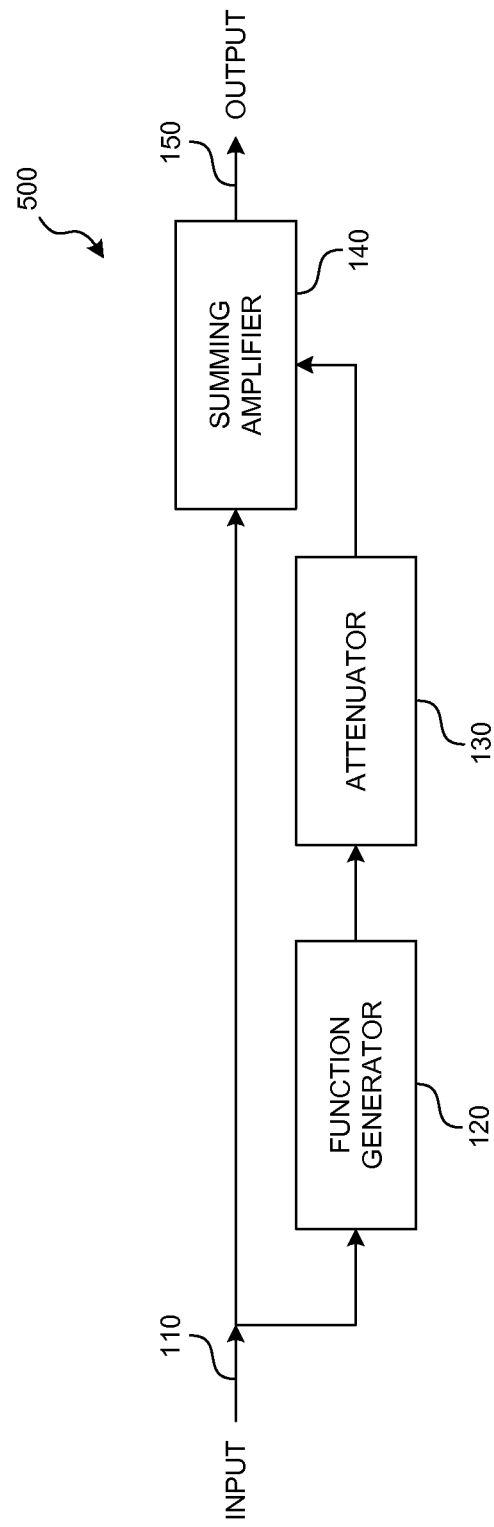
FIG. 5 is a schematic diagram of the vibration sensor output linearization in accordance with an embodiment of the presently disclosed technology.

FIG. 5 is a schematic diagram of a linearization circuit 500 in accordance with embodiments of the presently disclosed technology. A non-linear input 110 (for example the sensitivity curves F1, F2, F3 shown in FIG. 4) can be fed to a function generator 120 which outputs a function which can be attenuated by an attenuator 130. Next, the non-linear input 110 and the output of the attenuator 130 can be summed up in a summing amplifier 140 to produce a linearized output 150 (for example the linearized sensitivity curves L1, L2, L3 shown in FIG. 4). The linearized output 150 can be used for easier determination of the vibration amplitudes. Many function generators and linearization circuits are commercially available on the market, for example function generators AD640, AD639, AD538 and linearization circuits AD7569 by Analog Devices, Norwood, Mass.

From the foregoing, it will be appreciated that specific embodiments of the technology have been described herein for purposes of illustration, but that various modifications may be made without deviating from the disclosure. For example, in some embodiments, a function analyzer can be used in conjunction with the disclosed technology to help in determining dominant frequencies. In other embodiments, the output of the vibration sensor can be acquired by an analog-to-digital conversion circuit for a subsequent data processing which may be done outside of the vibration detector. Furthermore, the vibration detector may include analog or digital frequency filters for eliminating the unwanted harmonics or subharmonics of the main frequencies of the vibration structure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein. The following examples provide further embodiments of the present technology.

I claim:

1. A hand held vibration meter, comprising:
   a housing;
   a vibration sensor configured to contact a structure and convert vibrations of the structure to electrical signals, wherein the vibration sensor is contained at least partially within the housing;
   a vibration isolator in contact with the vibration sensor, wherein the vibration isolator is configured to filter one or more frequencies of vibration, and
   a force sensor responsive to a contact force applied to the vibration sensor,
   wherein the vibration meter includes a plurality of sensitivity curves for the vibration sensor, and wherein the vibration meter selects one of the sensitivity curves based on a contact force measured by the force sensor and uses the selected sensitivity curve when determining a vibration measurement.

2. The vibration meter of claim 1 wherein the force sensor comprises a pressure sensitive electrical resistor.

3. The vibration meter of claim 1 wherein the force sensor has a first side generally facing the vibration sensor and a second side facing away from the first side, the vibration meter further comprising:
   a plunger at the second side of the force sensor, wherein the plunger is configured to transfer the contact force to the force sensor; and
   a pad at the first side of the force sensor.

4. The vibration meter of claim 1 wherein the vibration isolator is a first vibration isolator at a front side of the vibration sensor, the vibration meter further comprising a second vibration isolator at a back side of the vibration sensor.

5. The vibration meter of claim 1 wherein the vibration isolator comprises rubber.

6. The vibration meter of claim 1, further comprising means for determining an adjusted vibration sensor response from a combination of a vibration sensor response and a force sensor response.

7. The vibration meter of claim 6 wherein the means for determining the adjusted vibration sensor response comprise a look up table, a processor, and a combination thereof.

8. The vibration meter of claim 6 wherein at least one of the vibration sensor response and the adjusted vibration sensor response is linearized.

9. A hand held vibration meter, comprising:
   a housing;
   a vibration sensor configured to contact a structure and convert vibrations of the structure to electrical signals, wherein the vibration sensor is contained at least partially within the housing;
   a vibration isolator in contact with the vibration sensor, wherein the vibration isolator is configured to filter one or more frequencies of vibration; and
   a force sensor responsive to a contact force applied to the vibration sensor,
   wherein the vibration meter measures a vibration of the structure using the electrical signals of the vibration sensor and a selected sensitivity curve for the vibration sensor, wherein the selected sensitivity curve is selected from a plurality of sensitivity curves based on a contact force measured by the force sensor.

10. The vibration meter of claim 9 wherein the vibration isolator is a first vibration isolator at a front side of the vibration sensor, the vibration meter further comprising a second vibration isolator at a back side of the vibration sensor.

11. The vibration meter of claim 9 wherein the force sensor comprises a pressure sensitive electrical resistor.

12. A method for measuring vibrations of a vibrating equipment using a vibration meter, comprising:
   sensing vibrations of the vibrating equipment by a vibration sensor in contact with the vibrating equipment;
   producing a vibration sensor response by the vibration sensor;
   measuring a contact force between the vibration sensor and the vibrating equipment; and
   adjusting the vibration sensor response based on the contact force to generate an adjusted vibration sensor response,
   wherein said adjusting the vibration sensor response includes selecting one of a plurality of sensitivity curves of the vibration sensor based on the measured contact force and using the selected sensitivity curve when adjusting the vibration sensor response.

13. The method of claim 12, further comprising:
   linearizing the vibration sensor response to generate a linearized frequency response.

14. The method of claim 13, further comprising:
   determining an amplitude of the vibrations based on the adjusted vibration sensor response.

15. The method of claim 12, further comprising:
   determining a frequency of the vibrations based on the adjusted vibration sensor response.

16. The method of claim 12, further comprising:
   filtering one or more frequencies of vibration using a vibration isolator in contact with the vibration sensor.

17. The method of claim 16 wherein the vibration isolator comprises:
   a first isolator at a front side of the vibration sensor; and
   a second isolator at a back side of the vibration sensor.

18. The method of claim 12 wherein said measuring a contact force between the vibration sensor and the vibrating equipment is performed by a force sensor.

* * * * *